(12) United States Patent
Olaker et al.

(10) Patent No.: US 6,438,182 B1
(45) Date of Patent: Aug. 20, 2002

(54) CORRELATOR WITH SERIAL-PARALLEL PARTITION

(75) Inventors: David A. Olaker, Melbourne; Greg P. Segallis, Palm Bay, both of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/260,096

(22) Filed: Mar. 2, 1999

(51) Int. Cl.[7] .................................................. H03D 1/00
(52) U.S. Cl. ..................... 375/343; 375/150; 708/422
(58) Field of Search ................................. 375/343, 367, 375/150, 142, 145, 149, 130, 140, 147, 316; 708/422, 423, 424, 425, 426; 370/320, 335, 342, 441, 479, 515

(56) References Cited

U.S. PATENT DOCUMENTS

| | | | |
|---|---|---|---|
| 3,604,911 A | * | 9/1971 | Schmitt ..................... 708/422 |
| 4,361,891 A | | 11/1982 | Lobenstein et al. |
| 4,528,674 A | | 7/1985 | Sweeney et al. |
| 4,575,861 A | | 3/1986 | Levreault ..................... 375/343 |
| 4,707,839 A | | 11/1987 | Andren et al. ............... 375/450 |
| 4,813,006 A | | 3/1989 | Burns et al. |
| 4,852,037 A | | 7/1989 | Aoki |
| 4,995,052 A | | 2/1991 | Thorvaldsen |
| 5,144,640 A | | 9/1992 | Yamamoto |
| 5,239,496 A | | 8/1993 | Vancraeynest |
| 5,285,472 A | | 2/1994 | Leonard et al. |
| 5,315,616 A | | 5/1994 | DeLisle et al. |
| 5,335,247 A | | 8/1994 | Olmstead |
| 5,388,127 A | | 2/1995 | Scarpa |
| 5,396,515 A | | 3/1995 | Dixon et al. |
| 5,457,713 A | | 10/1995 | Sanderford, Jr. et al. |
| 5,500,856 A | | 3/1996 | Nagase et al. |
| 5,504,915 A | | 4/1996 | Rarick |
| 5,530,716 A | | 6/1996 | Lipa |
| 5,566,202 A | | 10/1996 | Lang |
| 5,574,748 A | | 11/1996 | Vander Mey et al. |
| 5,598,429 A | | 1/1997 | Marshall |
| 5,600,660 A | | 2/1997 | Wolf |
| 5,659,574 A | | 8/1997 | Durrant et al. |
| 5,680,414 A | | 10/1997 | Durrant et al. |
| 5,724,383 A | | 3/1998 | Gold et al. |
| 5,724,485 A | | 3/1998 | Rainton |
| 5,748,891 A | | 5/1998 | Fleming et al. |
| 5,754,854 A | | 5/1998 | Kanamori et al. |
| 5,764,691 A | | 6/1998 | Hennedy et al. |
| 5,784,403 A | | 7/1998 | Scott |
| 5,862,173 A | | 1/1999 | Dent |

* cited by examiner

*Primary Examiner*—Stephen Chin
*Assistant Examiner*—Chieh M. Fan
(74) *Attorney, Agent, or Firm*—Allen, Dyer, Doppelt, Milbrath & Gilchrist, P.A.

(57) ABSTRACT

A correlator and method of correlating include a circuit that serially receives in phase (I) and quadrature (Q) signal data along parallel I and Q signal channels at one input bit time periods and converts the data into blocks of n bit parallel I and n bit parallel Q signal data. A data bus receives the signal and reference data. A multiplexer is positioned in each of the n parallel paths extending from the data bus and receives the n bit parallel I and Q reference data and a one bit shifted version of the respective n bit parallel I and Q signal data from the adjacent previous path. Each multiplexer includes I and Q summed outputs based on the value of I and Q reference data on a bit-by-bit basis. An n bit Wallace Tree Adder is connected to each of the I and Q summed outputs for each multiplexer within each of the n parallel paths and computes a count based on the number of bits that are set out of n bits to form partial correlation products. An adder and accumulator register in feedback with the adder adds partial correlation products into a single sum. An output bus receives pairs of I and Q component signal outputs from the parallel paths one at a time at one input bit time periods such that there is one correlation product output for every I and Q pair of input bits.

41 Claims, 6 Drawing Sheets

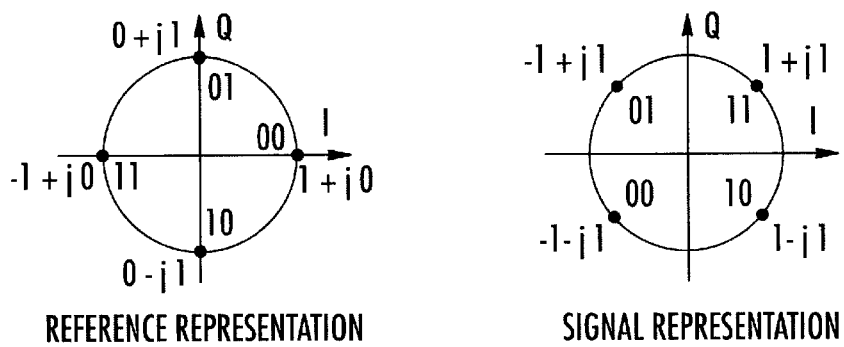

REFERENCE REPRESENTATION    SIGNAL REPRESENTATION

MAPPING BETWEEN INPUT & REFERENCE BITS AND THE
COMPLEX NUMBERS THEY REPRESENT

MAPPING BETWEEN BINARY VALUES AND THE COMPLEX NUMBERS THEY REPRESENT

TABULATION OF NUMERICAL MAPPING

| REFERENCE VALUES - $r_n$ | | SIGNAL VALUES - $x_n$ | |
|---|---|---|---|
| BINARY ($A_n, B_n$) | COMPLEX | BINARY ($I_n, Q_n$) | COMPLEX |
| 0,0 | $1+j0$ | 0,0 | $-1-j1$ |
| 0,1 | $0+j1$ | 0,1 | $-1+j1$ |
| 1,1 | $-1-j0$ | 1,0 | $1-j1$ |
| 1,0 | $0-j1$ | 1,1 | $1+j1$ |

FIG. 4A.

MULTIPLICATION BECOMES A MULTIPLEXING AND/OR INVERSION OPERATION

| $r_n$ | $z_{kn} = x_{k-N+n} r_n$ | $X_{kn}, Y_{kn}$ |
|---|---|---|
| 0,0 ($1+j0$) | $\xi(I_{k-N+n}) + j\xi(Q_{k-N+n})$ | $I_{k-N+n}, Q_{k-N+n}$ |
| 0,1 ($0+j1$) | $-\xi(Q_{k-N+n}) + j\xi(I_{k-N+n})$ | $\overline{Q}_{k-N+n}, I_{k-N+n}$ |
| 1,1 ($-1+j0$) | $-\xi(I_{k-N+n}) - j\xi(Q_{k-N+n})$ | $\overline{I}_{k-N+n}, \overline{Q}_{k-N+n}$ |
| 1,0 ($0-j1$) | $\xi(Q_{k-N+n}) - j\xi(I_{k-N+n})$ | $Q_{k-N+n}, \overline{I}_{k-N+n}$ |

FIG. 4B.

CASCADING CHIPS FOR REALIZING LONGER CORRELATORS

FIGURE C-2: CORRELATOR FOR THREE-BIT INPUT QUANTIZATION

CORRELATION ENERGY LOSS AS A FUNCTION OF SAMPLE RATE

LOSS DUE TO REFERENCE PHASE QUANTIZATION

CORRELATOR WITH SERIAL-PARALLEL PARTITION

FIELD OF THE INVENTION

This invention relates to a correlator and method for correlating, and more particularly, to a correlator and method of correlating in phase (I) and quadrature (Q) signal data.

BACKGROUND OF THE INVENTION

Correlators are often used in many different types of processing systems, such as a tracking and location system, where time and angle of arrival have to be determined. Other information can be correlated, such as video and radar signals, as well as tracking and location information. In one proposed tracking and location system, a chirp waveform can be processed with an oscillator and associated circuits to increase the bandwidth. A correlator can be used as a matched filter for processing the chirp waveform, including the step of demodulating the chirp waveform.

One type of complex correlator has a basic function. It compares a reference to an incoming signal and gives a complex correlation. In emerging technologies, it is desirable to handle high data rates, such as four megabits a second. Correlators, however, become much more complicated when a quadrature input is required, e.g., an I and Q input, not just a real input. For example, a video correlator may have a channel data in and quantisizes a number of bits and correlates 1,000 samples of single points. It is necessary, however, when quadrature inputs are used to perform a cross correlation, which increases complexity. It is necessary to compare complex reference points to incoming data and determine a value, and then correlate more data again, such as 250 nanoseconds later.

Typically, larger correlators run slower. When correlators at a very low data rate, it is possible to take the data in and calculate thousands of point correlations. The time involved is extensive. These prior art types of correlators had difficulty reaching high rates, such as 4 Mbs. There was no optimal solution found between parallel and serial data flow, nor the loading of references.

Additionally, prior art correlators typically cannot be cascaded. Cascading correlator chips is relevant for complex correlators that have I and Q quadrature channels. Having these two channels will usually double the size of the gates and increase the complexity of multiplexers. As to the cascading of multiple correlator chips in the past, if a correlator had 1,000 samples and it was necessary to have 2,000 samples, a designer would take two 1,000 sample correlators, input the data, and then run through a delay with a shift register or RAM based delay and feed it to two chips. Additionally, reference data were not efficiently loaded, and storage of data and references using traditional shift register flip flops was not efficient.

SUMMARY OF THE INVENTION

It is therefore an object of the present invention to provide a correlator with an enhanced serial-parallel partition where different sets of correlation operations are performed in parallel and serially to reduce correlation length and increase speed in an optimum partition.

The correlator of the present invention includes a circuit for serially receiving in phase (I) and quadrature (Q) signal data along parallel I and Q signal channels at one input bit time periods and converting the data into blocks of n bit parallel I and n bit parallel Q signal data. A data bus receives blocks of n bit parallel I and n bit parallel Q signal data and n bit parallel I and n bit parallel Q reference data from respective I and Q signal channels and I and Q reference channels. The data bus has n parallel paths extending therefrom.

A multiplexer is connected within each of the n parallel paths. Each multiplexer receives the n bit parallel I and Q reference data and a one bit shifted version of the respective n bit parallel I and Q signal data from an adjacent previous path. Each multiplexer includes I and Q summed outputs based on the value of I and Q reference data on a bit-by-bit basis.

An n bit Wallace Tree Adder is connected to each of the I and Q summed outputs for each multiplexer within each of the n parallel paths that computes a count based on the number of bits that are set out of n bits to form partial correlation products. An adder and an accumulator register are in feedback with the adder adds the partial correlation products into a single sum. An output bus receives pairs of I and Q component signal outputs from the parallel paths one at a time at one input bit time period such that there is one correlation product output for every I and Q pair of input bits.

In still another aspect of the present invention, the adder and register comprise an m bit adder and register. The number m is a number less than n. In one aspect of the present invention, the m bits are about six bits, such as a six-bit Wallace Tree Adder, while the number n corresponds to 32 bits.

In still another aspect of the present invention, a counter can be operatively connected to the adder that is incremented by the counter whenever the addition of two m bit numbers results in an overflow. A register can be operatively connected to the accumulator register in the counter and is latched by the output of the accumulator register and counter.

In still another aspect of the present invention, a memory circuit receives and stores within each I and Q signal channel a current block of n bit parallel I and n bit parallel Q signal data and an immediately previously received block of n bit parallel I and n bit parallel Q signal data. This memory circuit comprises a circular buffer circuit, which can include a random access memory that receives the respective current block of n bit parallel I and Q signal data and overwrites the respective previous block of n bit parallel I and Q signal data. A multiplexer is operative with the random access memory and first and second registers store the respective current and previous blocks of n bit parallel I and Q signal data.

In still another aspect of the present invention, at least one programmable read only memory (PROM) stores I and Q reference data and means is connected to the at least one programmable read only memory along I and Q reference channels for converting the I and Q reference data to n bit parallel I and n bit parallel Q reference data upon power up of the correlator. At least one serial-to-parallel conversion register is also positioned within each I and Q reference channel and serially receives the respective I and Q reference data and converts the reference data to respective n bit parallel I and n bit parallel Q reference data within respective I and Q reference channels.

At least one serial-to-parallel conversion register is positioned within each I and Q signal channel and serially receives the respective I and Q signal data and converts the respective I and Q signal data to respective n bit parallel I and n bit parallel Q signal data within respective I and Q signal channels. At least one random access memory is positioned within each of the I and Q signal channels and receives sequences of n bit parallel I and n bit parallel Q reference data within I and Q signal channels based on predetermined clock cycles.

A method of the present invention correlates a signal having an in phase (I) and quadrature (Q) signal components and comprises the step of receiving on a data bus blocks of n bit parallel I and n bit parallel Q signal data and n bit parallel I and n bit parallel Q reference data from respective I and Q signal channels and I and Q reference channels. The data bus has n parallel paths extending therefrom. The method also comprises the step of multiplexing the I and Q reference data within each of the n parallel paths with a one bit shifted version of the respective n bit parallel I and n bit parallel Q signal data from an adjacent previous path to produce I and Q summed outputs based on the value of I and Q reference data on a bit-by-bit basis.

The method also comprises the step of inputting the I and Q summed outputs into respective Wallace Tree Adders that are connected to each of the I and Q summed outputs within each of the parallel paths and computing a count based on the number of bits that are set out of n bits. The partial correlation products are added into a single sum. Pairs of I and Q component signal outputs are received from the parallel paths one at a time at one input bit time periods such that there is one correlation product output for every I and Q pair of input bits.

BRIEF DESCRIPTION OF THE DRAWINGS

Other objects, features and advantages of the present invention will become apparent from the detailed description of the invention which follows, when considered in light of the accompanying drawings in which:

FIGS. 3A and 3B represent a mapping scheme between input and reference bits and the complex numbers they represent.

FIG. 4A is a tabulation of the numerical mapping scheme showing the mapping between binary values and the complex numbers they represent.

FIG. 4B is a table showing how multiplication becomes a multiplexing and/or inversion operation.

DETAILED DESCRIPTION OF THE PREFERRED EMBODIMENTS

Figure 1:
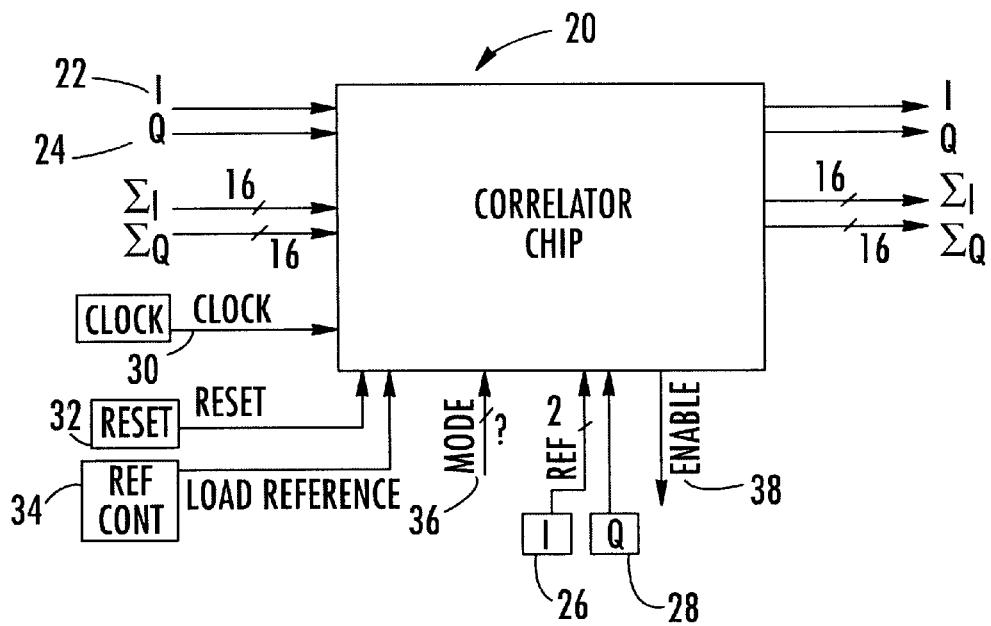
FIG. 1 is a high level block diagram showing a correlator chip of the present invention and illustrating its various inputs and outputs.

The correlator of the present invention is advantageous and can be used in an application specific integrated circuit (ASIC) as known to those skilled in the art, and allows replacement of the traditional prior art shift register storage with a random access memory (RAM) based storage of the reference and input data. This new input circuit reduces the number of required gates because of the more simplified cell structure of a RAM, as opposed to a shift register flip-flop. A RAM based storage is also made possible because of an optimum serial-parallel partition. For example, by performing 32 sets of 32-bit correlation operations in parallel, a required rate is lowered to allow cycling serially through an entire 16,384 bits of RAM during one input data bit time. This also results in requiring only a 32-bit Wallace Tree Adder as opposed to a 16,384-bit Wallace Tree Adder, as required by more conventional and prior art approaches.

The serial nature of the correlation process in accordance with the present invention reduces correlation length and allows trading reduced length for increased speed. The partitioning of the quantization of a single bit for each path through the correlator results in a reduced gate count because normal, complex, cross multiplying operation required is simplified to an operation that can be implemented with a two input and two output multiplexer. Multiple circuits can also be combined to increase the number of quantization bits to a desired level in a straightforward fashion.

A counter allows only an m (e.g., 6) bit adder to be used to sum the Wallace Tree outputs instead of a more conventional 14-bit adder, saving gate count and increasing the speed at which the circuit can operate. The cascaded features of the correlator of the present invention allows cascaded data paths to allow easy expansion of correlator length, and programmable length selection for reducing correlator length. Additionally, the correlator of the present invention is flexible for loading the reference data through the use of programmable read only memories (PROMS).

The correlator of the present invention can be used with wide area tracking and location devices, which use time and angle of arrival for the device. However, the invention is not limited to this particular use and devices, but can also be used for correlating any data requiring a complex cross correlation, including video information and radar. The present invention can particularly be used with the wide area tracking and location system, having a spread signal chirp waveform, and requiring a demodulation by a correlator that acts as a matched filter for the chirp waveform. For example, the correlator can correlate about 16,000 samples of quantized complex data. There is a quantized constant amplitude signal reference that is pilotable. The correlator chip of the present invention can reduce gate count from 1,000,000 to 100,000.

At its most basic level, the correlator of the present invention compares a reference to an incoming signal and gives a complex correlation. However, what is unique about the correlator of the present invention is its handling of high data rates of four megabits per second (4 Mbs). It can run at 4 Mhz with a 16,000 bit complex correlation. Many video correlators are typically 1,000 samples.

Also, the correlator of the present invention is a quadrature input (I, Q), not just a real input. A video correlator may have an input channel of data, which quantizes some number of bits and correlates 1,000 samples of the single points. The present invention concerns a cross correlation, which increases the complexity and can run at 4 Mhz. Thus, for every sample and 4 MHz, i.e., 250 nanoseconds, there is a computation of the 16,000 point correlation and all the complex reference points are compared to the incoming data and a value obtained. The architecture of the present invention also allows a partition between the parallel and serial amounts. The traditional shift register storage is replaced with a RAM based storage.

Also, a smaller Wallace Tree Adder is used and can run very fast. It is only six bits in one preferred aspect of the invention. The partition is made smaller with the serial operations and the results accumulated. Thus, the present invention allows an optimal partition. The wider the partition, the faster is the correlator. With a smaller correlator, more clock cycles are required. Thus, there should be a mix of the proper serial and parallel circuitry.

The present design also supports the cascading of multiple chips. Because it is quadrature, it is complex, which requires I and Q quadrature channels, thus doubling the size of the gates and increasing the complexity of multiplexers. The present invention also allows cascading of multiple chips. The cascaded data is delayed, stored and plugged into another chip.

There is also an adequate state machine interface to the serial PROMS, which allows low cost serial PROMS for reference loading.

A common requirement in signal processing equipment is to determine the amount of correlation between a received waveform and a known reference over a limited time interval. Mathematically, the correlation, z(t), is given by the expression $$z(t) = \int_{t-\tau}^{t} x(\xi) r(\xi - t + \tau) d\xi$$

where x(t) and r(t) denote the received waveform and reference signal, respectively. This equation assumes that r(t) is of no interest outside the interval $0 \pounds t \pounds t$. When r(t) is chosen to be the complex conjugate of the transmitted signal, this correlation equates to a time-invariant matched filter.

Quite often correlation is performed after digitizing the signal. For example, assuming that both x(t) and r(t) are sampled at a rate that results in N samples during an interval of t seconds, the desired correlation becomes $$z_k = \sum_{n=1}^{N} x_{k-N+n} r_n$$

where $x_n \approx x(n\tau/N)$ and $X_i$ & $r_i$ will be complex numbers when they represent baseband samples. One objective in a chirp matched filter effort is the use of a single-chip correlator which can implement this equation at sample rates up to 4 MS/s for large N.

The correlator of the present invention can be suited (but not limited) to address only situations where the reference is a constant amplitude waveform. Notable examples of constant amplitude waveforms are direct pseudo-noise spread signals (PSK modulated) and linear FM signals (chirps). With constant amplitude references, the exact reference samples can be given by $$r_k = Ae^{j\phi_k}$$

where A denotes an arbitrary constant and $\phi k$ denotes the phase associated with the kth sample.

While $\phi k$ can take on any value between 0 and $2\pi$, the implementation becomes especially tenable when the reference phase is restricted to take on one of four values (0, $\pi/2$, $\pi$, $3\pi/2$) consistent with QPSK modulation. Quantizing the reference phase to four values has two important effects: It allows individual reference samples to be represented by only two bits and it turns the multiplications of the $Z_k$ equation above into simple invert and/or multiplex operations. By using multiple correlator chips, it is possible to achieve finer quantization of reference phase, if it is desirable.

In accordance with the present invention, the input waveform x(t) is digitized prior to correlation with the reference. Digitization techniques known to those skilled in the art can be used. While the transmitted signal may have been constant amplitude, it is unlikely that the received signal-plus-noise waveform will be free of amplitude variations. Typically, the size (complexity) of signal processing hardware grows linearly with the number of bits used to represent the input amplitudes. One implementation is when the in-phase (I) and quadrature (Q) components are represented by a single bit, that is, one-bit input quantization.

The correlator has a one-bit input quantization to allow maximum extent length with reasonable hardware complexity. Performance loss due to one-bit quantization is estimated to about 2 dB in a Gaussian noise environment. There could be situations, such as one strong and one weak signal, where quantization loss can be significantly greater. Multiple one-bit correlators may be used to accommodate an arbitrary level of input quantization.

Correlator length can be defined as the number of samples in the summation, N. In general, sample rate is determined by the bandwidth of the signal being processed. Correlation time ($\tau$) is equal to the length (N) divided by the sample rate. Therefore, N is directly related to the signal's time-bandwidth product, which is the principal determinant of processing gain or system capacity. Hence, the larger the value of N, the better a system can perform.

In industry today, a length of 1024 is considered quite long for a high-speed correlator. The chip of the present invention, on the other hand, has length of 16,384 in one embodiment. If a larger N is required, chips can be pipelined without external hardware. The correlator of the present invention can accept complex inputs at rates up to 4 MS/s and produces a complete correlation answer (i.e. sum of N products) for each input.

Basic functional aspects of the correlator of one aspect of the present invention are set forth below:

Basic functionality—digitally correlate a signal with a reference
   signal
      quadrature channel inputs (I & Q)
      inputs quantized to one bit per channel
      inputted serially or in parallel (32-bit words)
      input rate at least 4 Mb/s per channel
      can accept external clock for inputs
   reference
      programmable on command
      provide sequencing signals necessary for
      programming from ROM
      reference retained internally after programming
      quadrature channel inputs (I & Q)
      inputs quantized to one bit per channel
      inputted serially or in parallel (32-bit words)
   correlation
      correlation interval of 16384 stages
      quadrature channel outputs (I & Q)
      outputs quantized to 16 bits per channel
      outputted serially, synchronous with input clock
      processing delay fixed and known extensibility
  cascadable to provide longer effective
  correlation interval or handle multi-level inputs
    output unmodified input bits (I&Q) after 16384 clock delay
    internal 16-bit summer on correlation output
  reducible
    provide correlation over intervals of 2 k bits for k=10,11,12,13&14

FIG. 1 illustrates a base block diagram of the correlator, illustrated at 20, of the present invention. It is manufactured as a single correlator chip by semiconductor manufacturing techniques well known to those skilled in the art.

The correlator chip 20, as will be described, is designed for wide area tracking and location systems using chirp spread spectrum and implements the above specifications. The chip can be implemented in an Application Specific Integrated Circuit (ASIC), and can contain approximately 100,000 gates. However, the correlator chip 20 is not limited to this end use, and can be used for numerous correlation end uses.

The design also supports cascading of multiple chips. As shown in FIG. 1, I and Q channels 22,24 are the data coming in. The I, Q references 26,28 are input to the correlator 20. The I and Q correspond to the quadrature channels. Because the correlator is complex, the complexity of any multiplexers (MUX) are increased. Other inputs to the correlator chip 20 include a clock signal 30, a reset signal 32 and a load reference signal 36 from a reference controller 34, which acts to load reference values from a PROM. A mode and enable 38 permits operational and mode control. The summation $\Sigma I$ and $\Sigma Q$ can be inputs as well as outputs for cascading.

Figure 2:
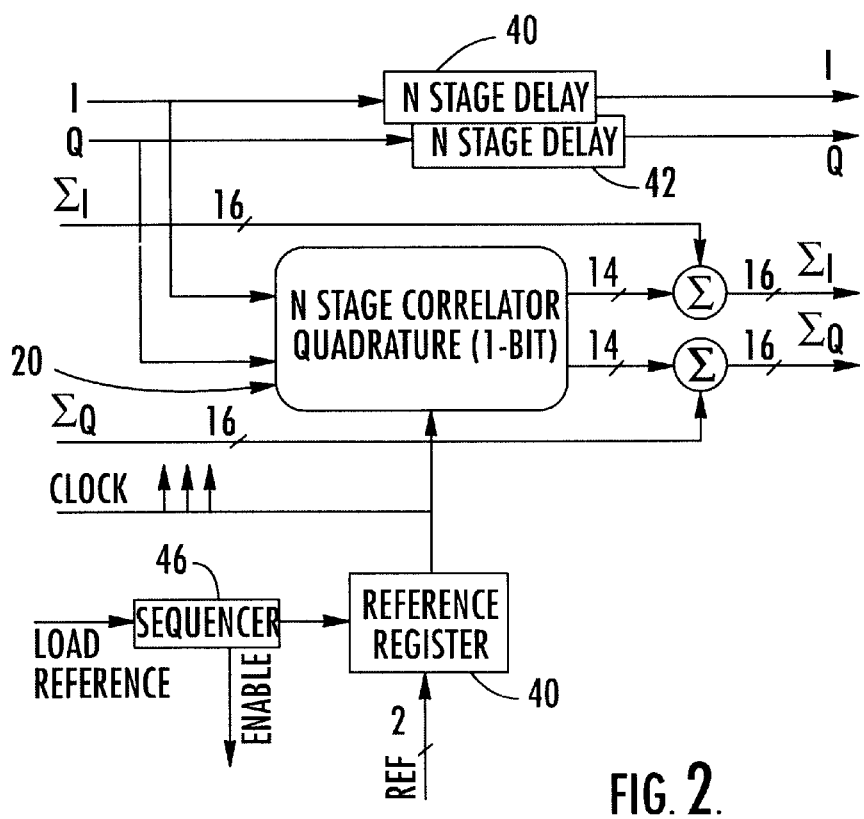
FIG. 2 is another high level block diagram of a correlator chip of the present invention and showing the various functions performed within the correlator.

FIG. 2 illustrates a more detailed high level block diagram and shows how I and Q data comes in and a portion of the data can pass through N stage delays 40,42 for cascading. Other summation I and Q data passes through the correlator, which also receives I and Q reference data 26,28 from a reference register 44 and a sequencer 46 that sends a signal for loading the references.

This internal design of the correlator of the present invention represents a major advance in correlator architecture. A more traditional approach to the architecture would result in a design requiring close to 1,000,000 gates to implement. Additionally, the architecture provides the capability to expand or contract the length and number of bits of quantization to allow the correlator to be easily custom tailored for a particular application.

The correlator architecture developed for this program has several key features which reduce the gate count required and increase the flexibility of the circuit. As will be explained in detail with reference to FIGS. 10A and 10B, the first of these features is the replacement of a traditional shift register storage with a random access memory (RAM) based storage of the reference and input data. This saves a large number of gates because of the more simple cell structure of a RAM as opposed to a shift register flip-flop. RAM storage is facilitated by a second feature, the use of an optimum serial-parallel partition of the required functions to be performed. By performing n(32) sets of n(32) bit correlation operations in parallel, the required rate is lowered sufficiently to allow cycling serially through an entire 16,384 bits of RAM during one input data bit time. Naturally, the number for n can vary, as well as the entire bits of RAM. For purposes of illustration, an n=32 bit correlation will be used in the description. This partition of functionality also results in requiring only a 32 bit Wallace Tree Adder as opposed to a 16,384 bit Wallace Tree Adder as required by a more conventional approach. The serial nature of the process also facilitates the reduction of the correlation length and allows the trading of reduced length for increased speed.

A third feature of the correlator design of the present invention is the partitioning of the quantization of a single bit for each path through the correlator. This results in reduced gate count, because the normal complex cross multiply operation required is simplified to an operation that can be implemented with a two input and two output multiplexer. As described below, multiple circuits can be combined to increase the number of quantization bits to the desired level in a simple straightforward fashion.

A fourth feature of the correlator design of the present invention is the use of a counter to allow only a 6 bit adder to be used to sum Wallace Tree outputs, instead of a much more complicated 14 bit adder. This saves gate count and increases the speed at which the circuit can operate.

Other features of the correlator design of the present invention include cascade data paths to allow for easy expansion of correlator length, programmable length selection for reducing correlator length, and flexible provisions for loading of the reference data.

Figure 10A:
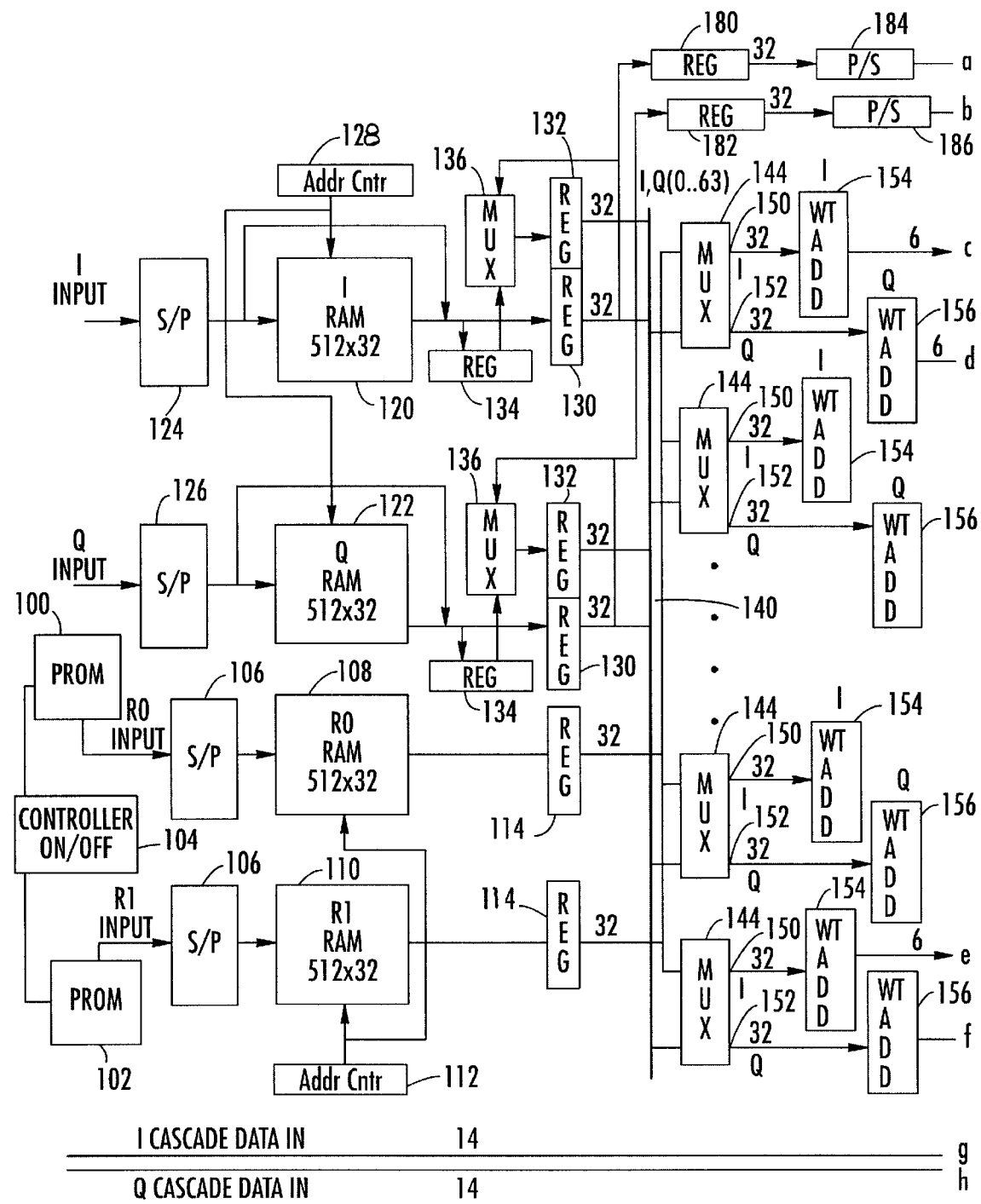
FIGS. 10A and 10B represent a high level block diagram of the components of a correlator of the present invention and showing a serial/parallel partition that can be used.
Figure 10B:
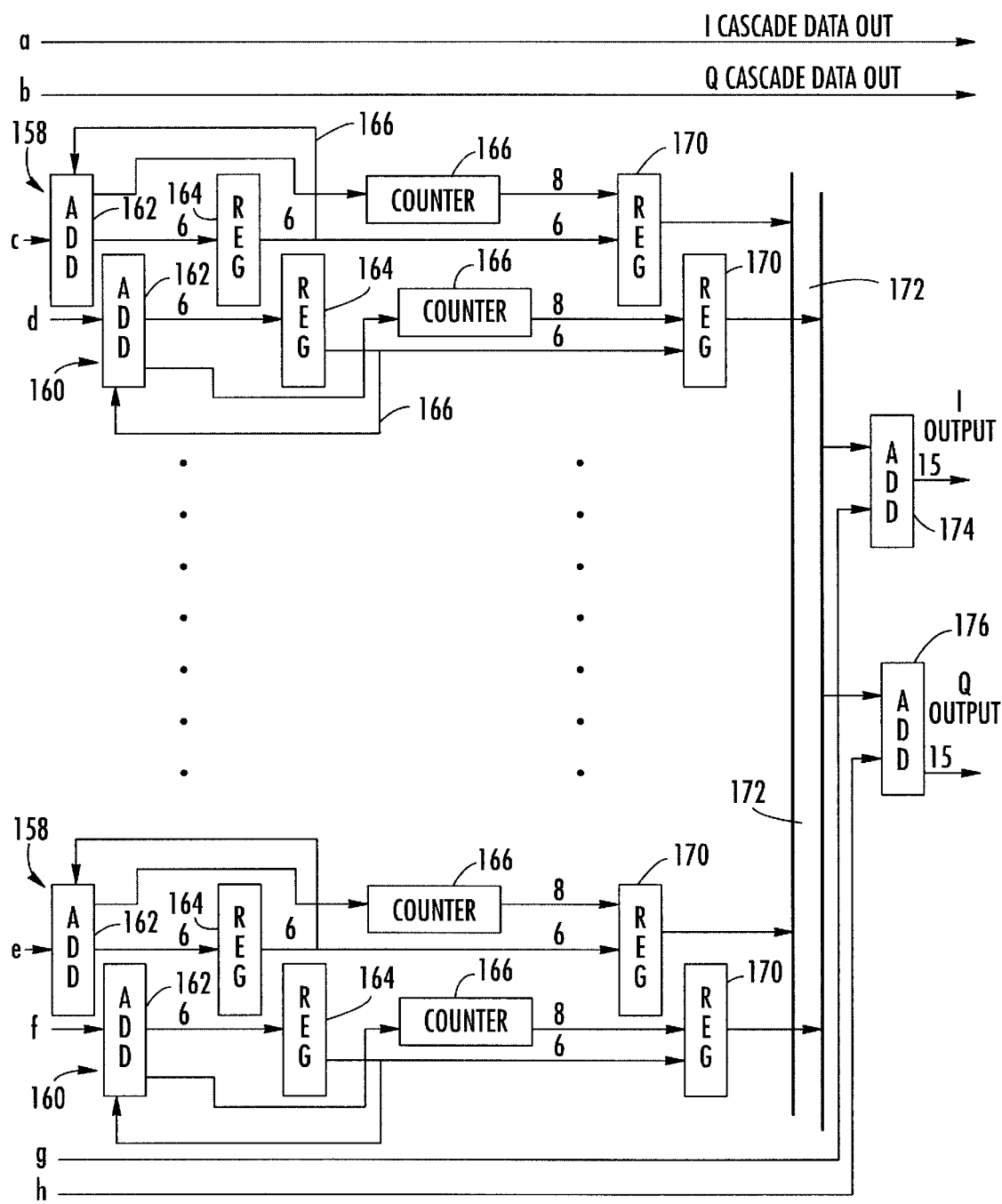

A functional block diagram of one example of a correlator circuit that could be used in the present invention is shown in FIGS. 10A and 10B. This diagram does not include control circuits or pipeline registers. For purposes of description, reference numerals used for describing the correlator of FIGS. 10A and 10B begin in the 100 series.

Reference data can initially be loaded as a state machine interface. The I (R0) and Q (R1) references are loaded initially to I,O PROMs 100, 102 where the reference values are stored. An off/on controller 104 is shown operative with the PROMs 100, 102 and operates the correlator. Upon power-up of the correlator, the I and Q references are loaded from the serial PROMs 100, 102. The reference data are then loaded to serial-to-parallel converters 106, which in one embodiment of the present invention, convert the one bit input reference data to n(32) bit wide reference data. The 32 bit wide reference data are loaded into respective I and Q (R0 and R1) RAMs 108, 110, which in one aspect of the present invention are illustrated as 512 by 32 RAM memories for each I and Q RAM.

The reference data for the correlation process is stored in the R0 and R1 RAMs 108, 110 at startup, and are then used continuously until another Reset is received (FIG. 1). Whenever the correlator is Reset the reference RAMS 108, 110 are loaded serially via the serial-to-parallel conversion registers (S/P) 106. The references 108, 110 can be loaded with either an internal or external clock depending on the circuit connections to the correlator. The address counter (Addr Cntr) 112 is used to generate the necessary signals for selecting the correct word to be written to when loading or to be read from when correlating. A 32 bit register (REG) 114, on each of the outputs of the RAM is used to hold the current 32 bits for correlation processing, while the next 32 bits are being read from the respective RAM 108, 110.

The I and Q input data for the correlation process is stored in I and Q RAMs 120, 122 and is loaded serially via I and Q serial-to-parallel conversion registers (S/P) 124, 126 along respective I and Q data channels. The I and Q input data can be loaded with an internally generated clock, which is synchronized to the external clock. Each I and Q RAM 124, 126 is loaded with 32 bit wide converted data, and in the one illustrated embodiment, a 512×32 bit memory. As described below, the RAMs 120, 122 and associated circuitry act as a circular buffer. An address counter (Addr Cntr) is operative with each I and Q RAM and is used to generate the necessary signals for selecting the correct word to be written to when loading.

As will be explained below, a sequential operation is performed through the RAMs 120, 122, which together with the other associated circuitry, acts as a circular buffer. The new data arrives, and the new 32 bit data overwrites the oldest 32 bits. Because the old and new 32 bit data are required in the correlating process, two registers are operative to receive the old and new 32 bit data. These two registers 130, 132 are illustrated as the top and bottom registers in the drawing of FIG. 10A.

The lower 130 of the two vertical 32 bit registers on the outputs of the RAMs 120, 122 is used to hold the current 32 bits for correlation processing while the next 32 bits are being read from a respective RAM. The upper 132 of the two vertical 32 bit registers (REG) on the output of the respective RAM is used to hold the previous 32 bits for correlation processing. A total of 64 bits of input data are required at one time. The horizontal loading register 134 shown below the multiplexer (MUX) in each I, Q channel is required, because at the beginning of each correlation cycle both of the vertical registers must be reloaded at the same time. The horizontal register 134 is loaded with the appropriate word at an earlier time in the previous cycle, and is then loaded into the top vertical register 132 via the multiplexer 136 at the beginning of the next cycle. Thus, a circular buffer circuit is formed within each I and Q reference channel for each I and Q input.

It is evident that 32 bits of parallel data now pass from the I and Q RAMs 120, 122 via the circular buffer circuit. Thus, the speed of the correlator is increased. However, there will be 32 correlations. The data from both registers is output to the I, Q (0..63) data bus 140, which receives the n(32) bit parallel I and Q data. Naturally, n could be a number other than 32. However, 32 parallel operations has been found as advantageous, followed by serial correlation. The data bus 140 has 32 separate data paths extending therefrom. To accommodate the 32 correlations, each data path receives one bit shifted version of the previous path. Because it is a 32 bit word that is correlated, there are 32 correlations. When a 32 bit word is shifted 32 times, 64 bits of data should be present. At the last position, there is only one bit of data from the current register, and the other 31 bits should be from the previous 31 bits of data. Thus, the circuit structure becomes a shift register with the current and old 32 bits. Each of the 32 bits will be compared to a one bit shifted version of the I, Q data word.

Each of the 32 multiplexers (MUX) 144 to the right of the I,Q (0..63) data bus receives 32 bits of I data, 32 bits of Q data, 32 bits of R0 data, and 32 bits of R1 data. Each multiplexer 144 chooses whether to send the I data, I inverted data, Q data, or Q inverted data to the respective I and Q sum outputs 150, 152 based on the value of R0 and R1 data on a bit by bit basis. The 32 bits from each of the I and Q sum outputs 150, 152 are fed to a respective I and Q 32 bit Wallace Tree Adder (WT ADD) 154, 156. The Wallace Tree Adder computes a count based on the number of bits that are set out of the 32 bits. Because the maximum value of this count is 32, it requires only 6 bits to represent all possible values.

It is evident that each Wallace Tree Adder circuit 154, 156 forms a 32 bit wide adder. Thus, a binary count is obtained of how many are 1's, which is a partial correlation. For a one 32 bit data word, a six bit value is obtained, representing a number from 0 to 32. This can be thought of as a partial correlation, followed by a serial operation of a respective I and Q accumulator structure, indicated generally at 158 and 160, each having an adder 162 and register 164 with a feedback loop circuit 166. The uniqueness of the correlator of the present invention is manifest, wherein the correlator slices the 16,000 bits into 512 units, running 512 times faster than the data rate at this point. If the correlator is operating at 4 megahertz, the effective data rate could be considered 16 kilohertz. Thus, in the illustrated example, the Wallace Tree Adder 154, 156 is illustrated as a six bit adder, because a seven bit adder would be more difficult from a practical standpoint.

The 6 bits out of the I and Q Wallace Tree Adders 154, 156 are connected to the 6 bit accumulator circuit 158, 160, each of which includes a 6 bit adder (ADD) 162, a 6 bit register (REG) 164 with feedback 166 and a 8 bit counter (COUNTER) 166. The function of the accumulators are to add the 512 partial correlation products into a single sum. Because each of the partial correlation products are only 6 bits, a 6 bit adder is sufficient. The carry out of the adders 162 are used to increment the counters 166 whenever the addition of the two six bit numbers results in an overflow condition. This use of the counter 166 prevents having to have a 14 bit adder, which would require more circuits and be slower. The 6 bit final output of the accumulator register 164 and the 8 bit final output of the counter 166 is latched into a 14 bit register (REG) 170, so the accumulator and counter can be cleared for the next cycle.

Each of the I and Q pairs of 14 bit registers 170 outputs are selected onto output bus 172 one at a time, with one pair of outputs occupying one input bit time. There is therefore one complex correlation product output for every I and Q pair of input bits. The output bus 172 feeds the final I and Q cascade adders (ADD) 174, 176, which can be used to sum inputs from another correlator for expansion reasons, illustrated as I CASCADE DATA IN and CASCADE DATA IN. Both are 14 bit.

At the top section of FIG. 10A is a pair of I and Q registers 180, 182 (REG) and parallel to serial converters (P/S) 184, 186 which are part of the N stage delay, circuits 40, 42 (FIG. 2), also used to connect another correlator for expansion reasons. The cascaded data is delayed and held. Thus, it can be plugged into another correlator chip and added in.

A desired digital correlation value is:

$$z_k = \sum_{n=1}^{N} z_{kn} = \sum_{n=1}^{N} x_{k-N+n} r_n.$$

However, the value computer by the correlator hardware is directly related but not equal to $Z_k$ above. The internal number system has been altered to simplify the hardware design. Numbers can be represented for the correlator. The chip's output relates to $Z_k$.

In one aspect of the present invention, the reference can be assumed to be quantized to one of four phases. FIGS. 3A and 3B illustrate how those four phases are related to the two-bit reference values that are to be loaded into the correlator. Also shown is the set of possible signal values resulting from one-bit I and Q quantization.

FIG. 4A is a table showing the mapping between binary values and the complex numbers they represent.

Of particular importance is the fact that $X_n$ is related to In and Qn through the linear relationship:

$$x_n = \xi(I_n) + j\xi(Q_n)$$

where $\xi(\alpha) = 2\alpha - 1$. For one-bit quantization the radius of the circle upon which signal points lie is irrelevant. It will, however, take on significance for multi-bit quantization. Another important characteristic of this relationship is that $\xi(\overline{\alpha})=2(1-\alpha)-1=-\xi(\alpha)$. It is now possible to define the following multiplication table such that $$z_{kn}=x_{k-N+n}r_n=\xi(X_{kn})+j\xi(Y_{kn})$$

FIG. 4B is a table illustrating that multiplication can become a multiplexing and/or inversion operation in the correlator of the present invention.

The third column in the table of FIG. 4B illustrates how multiplication by rn can be accomplished by invert and/or multiplex operations performed on the input bits.

$$z_k = \sum_{n=1}^{N} z_{kn} = \sum_{n=1}^{N} \{\xi(X_{kn}) + j\xi(Y_{kn})\}$$

$$= \sum_{n=1}^{N} \{[2X_{kn} - 1] + j[2Y_{kn} - 1]\}$$

$$= \left[2\left(\sum_{n=1}^{N} X_{kn}\right) - N\right] + j\left[2\left(\sum_{n=1}^{N} Y_{kn}\right) - N\right]$$

$$= 2\left[\left(\sum_{n=1}^{N} X_{kn}\right) - j\left(\sum_{n=1}^{N} Y_{kn}\right)\right] - N[1+j1]$$

which implies that the hardware need only compute the sum of the Xkns and the sum of the Ykns to evaluate the desired correlation.

The correlator of the present invention provides two outputs which correspond to the sums $$\left(\sum_{n=1}^{N-1} X_{kn}\right) \text{ and } \left(\sum_{n=1}^{N-1} Y_{kn}\right)$$

These numbers will be integers in the range of 0 to N−1 inclusive. The summations can be truncated one term early in order to avoid the possibility of having an answer of N, which would require an additional output bit since N=16384. $Z_k$ can be obtained from these outputs (except for the missing bit) by scaling and biasing as indicated in the preceding section.

Broadly, the correlator could require one-bit quantization of the I and Q inputs as well as 90° quantization of its constant amplitude reference, it is very general in its applicability. This is a result of the fact that it is extensible in length, input quantization and reference phase quantization.

Figure 5:
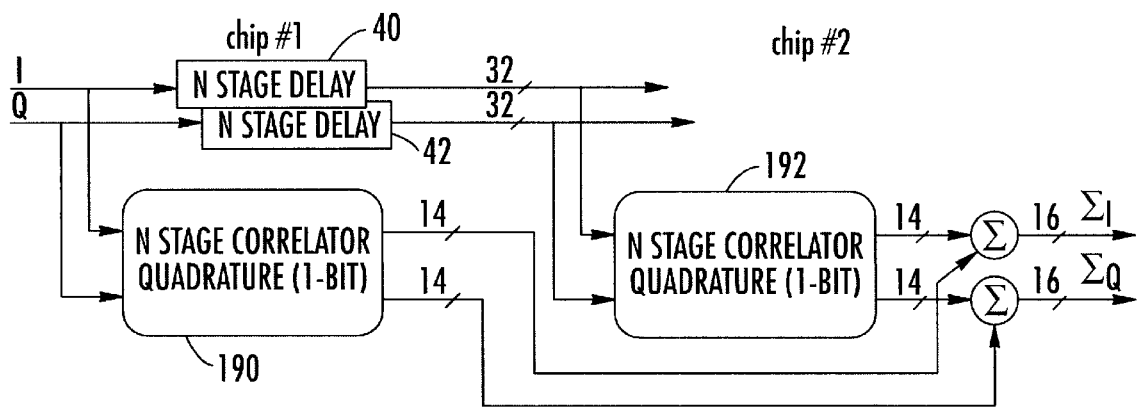
FIG. 5 is a high level block diagram showing how two correlators can be cascaded to obtain a longer correlator.

As noted before, the correlator of the present invention has been designed to permit cascading two correlator chips with no external hardware (i.e. length 32768) and allow unbounded cascading using external summers. FIG. 5 illustrates the input delay path and output summing operation (internal to the chip) that permit cascading with correlator chips 190, 192.

Since the reference register for each correlator is independently programmed, there is no required relationship between the cascaded segments of the waveform (i.e. even or odd symmetry is not required).

If the received I and Q are quantized to K bits each, then the received sample, xn, may be considered to be $$x_n = \sum_{k=0}^{K-1} 2^k [(2I_{nk} - 1) + j(2Q_{nk} - 1)] / \sum_{k=0}^{K-1} 2^k$$

where Ink and Qnk are either 0 or 1, and the denominator was chosen arbitrarily to make the sample values range be −1<xn<1. In this notation, Ink denotes the kth bit in the nth sample for the I channel, with In0 being the least significant bit. The desired correlation (for time aligned reference) is given by $$z = \sum_{n=1}^{N} \left\{ \frac{r_n \sum_{k=0}^{K-1} 2^k [(2I_{nk} - 1) + j(2Q_{nk} - 1)]}{\sum_{k=0}^{K-1} 2^k} \right\}$$

$$= 2 \sum_{k=0}^{K-1} 2^k \left[ \sum_{n=1}^{N} X_{kn} + j \sum_{n=1}^{N} Y_{kn} \right] / \sum_{k=0}^{K-1} 2^k - N[1+j1]$$

which is just a weighted sum of the outputs from K one-bit correlators, where X and Y are defined as above. This implies a structure as illustrated in FIG. 6, with the least significant bit (LSB) and most significant bit (MSB).

Figure 6:
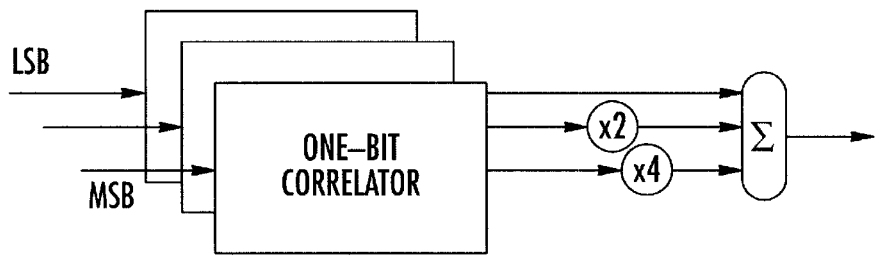
FIG. 6 illustrates a correlator for three-bit input quantization.

The output from the correlator shown in FIG. 6 is $$\sum_{k=0}^{K-1} 2^k \left[ \sum_{n=1}^{N} X_{kn} + j \sum_{n=1}^{N} Y_{kn} \right]$$

which can readily be scaled and biased to give the value for z if necessary.

It is also possible to form a weighted sum of correlator outputs that is equivalent to finer reference phase quantization, should that be desirable. The inherent reference quantization (i.e. four phases) can be doubled, quadrupled, and multiplied more. The correlation with a reference quantized to M phases (where M is a multiple of two) can be obtained from two separate correlations each with reference quantized to M/2 phases. Successive application of this result can give equivalent reference phase quantization of 4*2 m phases using the correlator chip of the present invention and some external combining hardware.

The desired correlation as noted above is:

$$z_k = \sum_{n=1}^{N} x_{k-N+n} r_n$$

where $r_n = e^{jm_n \Delta_\phi}$, $\Delta_\phi = 2\pi/M$ and $0 \leq m_n < M$; which corresponds to quantizing the reference phase to one of M values (M even). Define two pseudo-references in the following way:

$$r_{1n} = \begin{cases} e^{j[m_n/2]2\Delta_\phi} & m \text{ even} \\ e^{j[(m_n+1)/2]2\Delta_\phi} & m \text{ odd} \end{cases}$$

$$r_{2n} = \begin{cases} e^{j[m_n/2]2\Delta_\phi} & m \text{ even} \\ e^{j[(m_n-1)/2]2\Delta_\phi} & m \text{ odd} \end{cases}$$

The term in [ ] is always an integer between 0 and M/2, so that both r1 and r2 form N-value reference sequences quantized to M/2 phases. Consider the term $$r_{1n} + e^{j\Delta\phi}r_{2n} = \begin{cases} e^{j[m_n/2]2\Delta_\phi} + e^{j\Delta_\phi}e^{j[m_n/2]2\Delta_\phi} & m \text{ even} \\ e^{j[(m_n+1)/2]2\Delta_\phi} + e^{j\Delta_\phi}e^{j[(m_n-1)/2]2\Delta_\phi} & m \text{ odd} \end{cases}$$

$$= e^{j(m_n+1)\Delta_\phi} + e^{jm_n\Delta_\phi}$$

$$= 2e^{j\Delta_\phi/2}e^{jm_n\Delta_\phi}\cos(\Delta_\phi/2)$$

Figure 7:
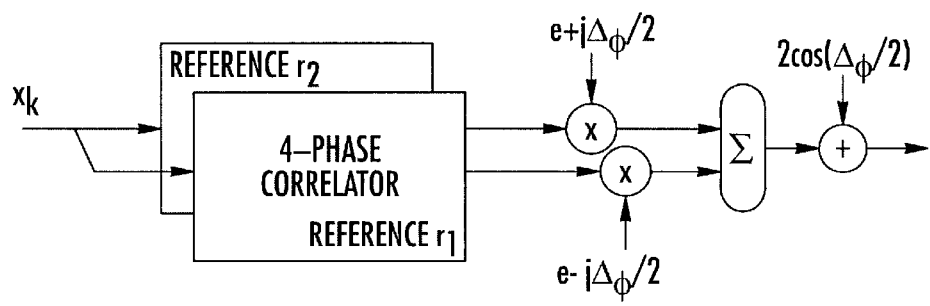
FIG. 7 is a block diagram illustrating a four-phase correlator.

Substituting this result into the $Z_k$ equation gives the final result $$z_k = \sum_{n=1}^{N} x_{k-N+n} \frac{(r_{1n} + e^{j\Delta_\phi}r_{2n})}{2e^{j\Delta_\phi/2}\cos(\Delta_\phi/2)}$$

$$= \frac{1}{2\cos(\Delta_\phi/2)}\left[e^{-j\Delta_\phi/2}\left\{\sum_{n=1}^{N} x_{k-N+n}r_{1n}\right\} + e^{j\Delta_\phi/2}\left\{\sum_{n=1}^{N} x_{k-N+n}r_{2n}\right\}\right]$$

where the terms in { } are readily recognized as two separate correlations having the same input sequence but different references. This suggests the direct implementation of an 8-phase reference using the correlator chips as shown in FIG. 7. It is likely that one of the complex multiply operations and the output scaling can be omitted, depending on the application Due to system considerations, primarily frequency uncertainty, a linear FM (chirp) waveform has been identified as the most desirable signal. The baseband signal can be expressed as $$s(t) = e^{j\alpha t^2/2}$$

where $\tau c$ denotes the chirp duration and $\tau c/2 \pounds t < \tau c/2$. The time-bandwidth product is the principal characteristic of any signal in terms of communication and interference rejection (i.e. capacity) performance. For a chirp the time-bandwidth product is $$TW = \frac{\alpha \tau_c^2}{2\pi}$$

For the current correlation system, such as for wide area tracking and location, the design $\tau c$ is 8.192 msec and W is 4 MHz, making the time-bandwidth product as 32768.

Time-invariant matched filter reception is required to achieve reliable signal detection with an asynchronous transmitter architecture. One operational scenario that can be used for the correlator of the present invention has a receive signal processor concatenating two chips to implement a length 32,768 matched filter at 4 MS/s for each channel (up to 16) at a receive site. Two-bit I,Q quantization could also be used, which would require four correlator chips per channel.

The concept of a time-invariant matched filter is straightforward. If a (noise free) received waveform, x(t) contains a chirp centered at time t=to is processed by a matched filter, the resulting output, z(t), will be $$z(t) = \int_{t-\tau_c/2}^{t+\tau_c/2} x(\xi) e^{-j\alpha(\xi-t)^2/2} d\xi$$

$$= (1 - |\Delta_t|) \operatorname{sinc}(TW\Delta_t[1 - |\Delta_t|])$$

where $\Delta t = (t-to)/\tau c$ is the normalized time difference between the observation time (t) and the chirp time-of-arrival (to). The "compressed pulse" out of the matched filter looks like a sinc( ) function in the region around $\Delta t=0$ and has a pulse width roughly $\tau c/TW$. Clearly, the number of such pulses which are uniquely resolvable is determined and bounded by the time-bandwidth product, a direct implication on ultimate system capacity.

Figure 8:
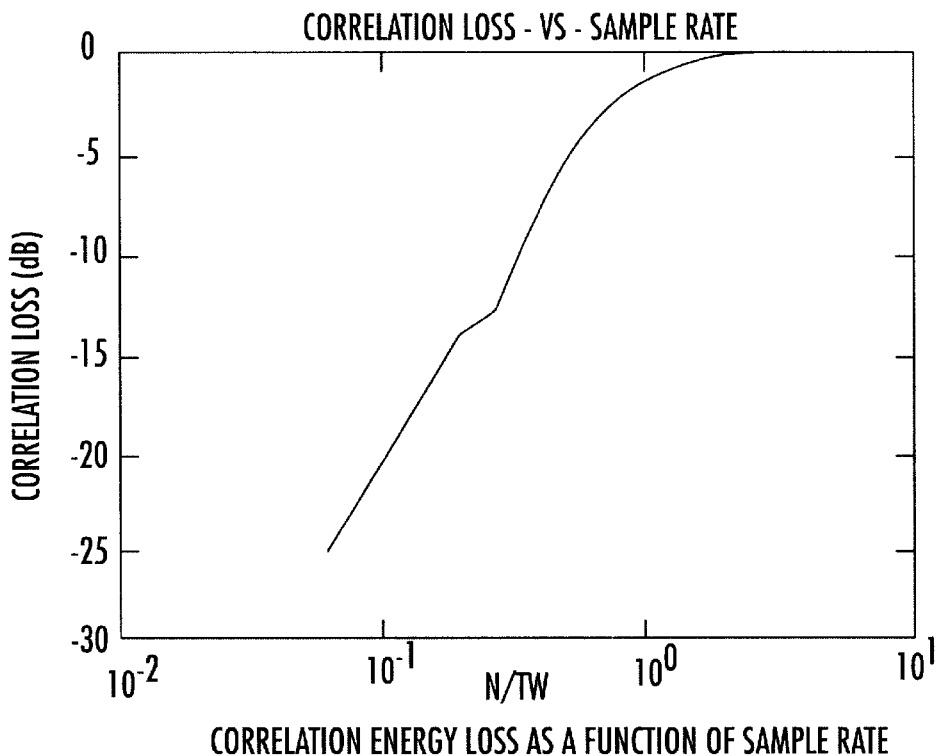
FIG. 8 is a graph illustrating the correlation energy loss as a function of sample rate.

If the matched filter is implemented digitally the equation becomes $$z_k = \sum_{n=1}^{N} x_{k-N+n} r_n$$

where N denotes the number of samples taken in a chirp duration and, in the limit of high sample rates (i.e. N® ¥), zk=z(k$\tau$c/N). The first tradeoff addressed is selection of the correlator length, N, since complexity of the correlation hardware increases with increasing N. The graph in FIG. 8 shows how compressed pulse energy decreases as a function of N. The curve has a definite knee in the region of N=TW indicating the best compromise between performance and complexity. At N=TW (i.e. sample rate=chirp bandwidth) the loss in correlation energy is 1.17 dB relative to that obtained from sampling infinitely fast.

The last track relates to the number of bits used to quantize the I and Q inputs to the correlator of the present invention.

Figure 9:
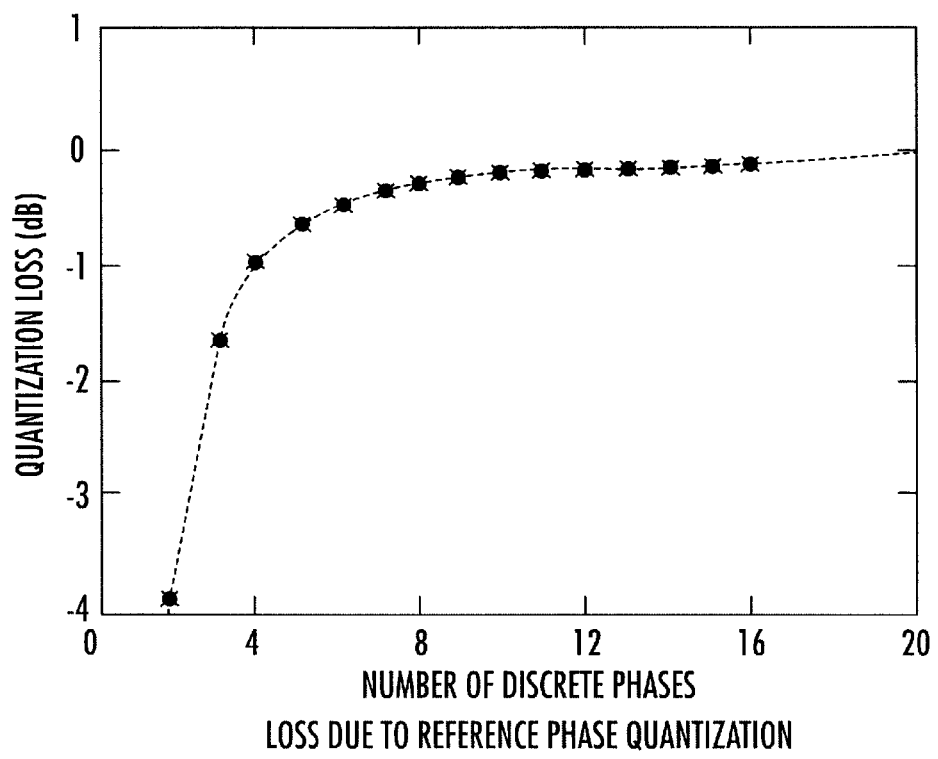
FIG. 9 is a graph illustrating the loss due to reference phase quantization.

The graph in FIG. 8 corresponds to an unquantized reference, that is, the reference phase can assume any value between 0 and $2\pi$. To be realizable, the correlator must quantize this reference phase to only a few distinct values. The graph in FIG. 9 shows the additional loss caused by reference phase quantization when N=TW. Once again the curve exhibits a knee, this time in the vicinity of four phases. The additional energy loss arising from quantizing the reference to have one of 4 values is 0.9 dB.

This patent application is related to commonly assigned, co-pending patent applications entitled, "CORRELATOR HAVING ENHANCED MEMORY FOR REFERENCE AND INPUT DATA" and "CORRELATOR WITH CASCADE DATA PATHS TO FACILITATE EXPANSION OF CORRELATOR LENGTH" filed on the same date of the present application by the same inventors.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A correlator comprising:
    a circuit for serially receiving in phase (I) and quadrature (Q) signal data along parallel I and Q signal channels at one input bit time periods and converting the data into blocks of n bit parallel I and n bit parallel Q signal data;
    a data bus that receives blocks of n bit parallel I and n bit parallel Q signal data and n bit parallel I and n bit parallel Q reference data from respective I and Q signal channels and I and Q reference channels, said data bus having n parallel paths extending therefrom;
    a multiplexer connected within each of the n parallel paths, each multiplexer receiving the n bit parallel I and Q reference data and a one bit shifted version of the respective n bit parallel I and Q signal data from an adjacent previous path, and including I and Q summed outputs based on the value of I and Q reference data on a bit by bit basis;

an n bit Wallace Tree Adder connected to each of the I and Q summed outputs for each multiplexer within each of the n parallel paths that computes a count based on the number of bits that are set out of n bits to form partial correlation products;

an adder and an accumulator register in feedback with the adder that adds partial correlation products into a single sum; and an output bus for receiving pairs of I and Q component signal outputs from the parallel paths one at a time at one input bit time periods such that there is one correlation product output for every I and Q pair of input bits.

2. A correlator according to claim 1, wherein said adder and register comprise an m bit adder and register, wherein m is a number less than n.

3. A correlator according to claim 2, and further comprising a counter operatively connected to the adder that is incremented by the counter whenever the addition of two m bit numbers results in an overflow.

4. A correlator according to claim 1, and further comprising a register operatively connected to said accumulator register and said counter that is latched by the output of said accumulator register and counter.

5. A correlator according to claim 1, and further comprising a memory circuit for receiving and storing within each I and Q signal channel a current block of n bit parallel I and n bit parallel Q signal data and an immediately previously received block of n bit parallel I and n bit parallel Q signal data.

6. A correlator according to claim 5, wherein said memory circuit comprises a circular buffer circuit.

7. A correlator according to claim 6, wherein each of said circular buffer circuits comprises a random access memory that receives the respective current block of n bit parallel I and Q signal data and overwrites the respective previous block of n bit parallel I and Q signal data, a multiplexer, and first and second registers that store the respective current and previous blocks of n bit parallel I and Q signal data.

8. A correlator according to claim 1, and further comprising at least one programmable read only memory (PROM) that stores I and Q reference data and means connected to said at least one programmable read only memory along I and Q reference channels for converting the I and Q reference data to n bit parallel I and n bit parallel Q reference data upon power up of the correlator.

9. A correlator according to claim 1, and further comprising at least one serial-to-parallel conversion register positioned within each I and Q reference channel that serially receives the respective I and Q reference data and converts the reference data to respective n bit parallel I and n bit parallel Q reference data within respective I and Q reference channels.

10. A correlator according to claim 1, and further comprising at least one serial-to-parallel conversion register positioned within each I and Q signal channel that serially receives the respective I and Q signal data and converts the respective I and Q signal data to respective n bit parallel I and n bit parallel Q signal data within respective I and Q signal channels.

11. A correlator according to claim 1, and further comprising at least one random access memory positioned within each of said I and Q signal channels that receives blocks of n bit parallel I and n bit parallel Q reference data within respective I and Q signal channels based on predetermined clock cycles.

12. A correlator comprising:

a signal input that serially receives in phase (I) and quadrature (Q) signal data along parallel I and Q signal channels at one input bit time periods;

a circuit connected to the signal input for converting the data into blocks of n bit parallel I and n bit parallel Q signal data;

a data bus connected to said converting means that receives blocks of n bit parallel I and n bit parallel Q signal data and n bit parallel I and Q reference data from respective I and Q signal channels and I and Q reference channels, said data bus having n parallel paths extending therefrom;

a multiplexer connected within each of the n parallel paths, each multiplexer receiving n bit parallel I and Q reference data and a one bit shifted version of the respective n bit parallel I and Q signal data from an adjacent previous path and having I and Q summed outputs based on the value of I and Q reference data on a bit by bit basis;

an n bit Wallace Tree Adder connected to each of the I and Q summed outputs for each mulitplexer within each of the n parallel paths that computes a count based on the number of bits that are set out of n bits to form partial correlation products;

an adder and accumulator that adds partial correlation products into a single sum; and an output bus for receiving pairs of I and Q component signal outputs from the parallel paths one at a time at one input bit time periods such that there is one correlation product output for every I and Q pair of input bits.

13. A correlator according to claim 12, wherein said adder and register comprise an m bit adder and register, wherein m is a number less than n.

14. A correlator according to claim 13, and further comprising a counter operatively connected to the adder that is incremented by the counter whenever the addition of two m bit numbers results in an overflow.

15. A correlator according to claim 12, and further comprising a register operatively connected to said accumulator register and said counter that is latched by the output of said accumulator register and counter.

16. A correlator according to claim 12, and further comprising at least one programmable read only memory (PROM) that stores I and Q reference data, and means connected to said at least one programmable read only memory along I and Q reference channels for converting the I and Q reference data to n bit parallel I and n bit parallel Q reference data upon power up of the correlator.

17. A correlator according to claim 12, and further comprising at least one serial-to-parallel conversion register positioned within each I and Q reference channel that serially receives the respective I and Q reference data and converts the reference data to respective n bit parallel I and n bit parallel Q reference data within respective I and Q reference channels.

18. A correlator according to claim 12, and further comprising at least one serial-to-parallel conversion register positioned within each I and Q signal channel that serially receives the respective I and Q signal data and converts the respective I and Q signal data to respective n bit parallel I and n bit parallel Q signal data within respective I and Q signal channels.

19. A correlator according to claim 12, and further comprising at least one random access memory positioned within each of said I and Q signal channels that receives sequences of n bit parallel I and n bit parallel Q reference data within respective I and Q signal channels based on predetermined clock cycles.

20. A correlator comprising:

a circuit for serially receiving in phase (I) and quadrature (Q) signal data along parallel I and Q signal channels at one input bit time periods and converting the data to blocks of n bit parallel I and n bit parallel Q signal data;

at least one programmable read only memory (PROM) that stores I and Q reference data;

a circuit connected to said at least one programmable read only memory for receiving the I and Q reference data from said programmable read only memory along respective I and Q reference channels and converting the I and Q reference data to blocks of n bit parallel I and n bit parallel Q reference data upon power up of the correlator;

a circular buffer circuit positioned within each parallel I and Q signal channel, each circular buffer circuit receiving respective n bit parallel I and n bit parallel Q signal and storing an immediate previous block of I and Q signal data within the respective I and Q signal channels;

a data bus that receives blocks of n bit parallel I and Q signal data and n bit parallel I and Q reference data from said circular buffer circuit, said data bus having n parallel paths extending therefrom;

a multiplexer connected within each of the n parallel paths, each multiplexer receiving the n bit parallel I and Q reference data and a one bit shifted version of the respective n bit parallel I and Q signal data from an adjacent previous path and having I and Q summed outputs based on the value of I and Q reference data on a bit by bit basis;

an n bit Wallace Tree Adder connected to each of the I and Q summed outputs for each mulitplexer within each of the n parallel paths that computes a count based on the number of bits that are set out of n bits to form partial correlation products;

an adder and accumulator that adds partial correlation products into a single sum; and an output bus for receiving pairs of I and Q component signal outputs from the parallel paths one at a time at one input bit time periods such that there is one correlation product output for every I and Q pair of input bits.

21. A correlator according to claim 20, wherein said circular buffer circuit comprises:

a random access memory that receives the respective current blocks of n bit parallel I and Q signal data and overwrites the respective previous blocks of n bit parallel I and Q signal data, a multiplexer, and first and second registers that store the respective current and previous blocks of n bit parallel I or Q signal data.

22. A correlator according to claim 20, wherein said adder and register comprise an m bit adder and register, wherein m is a number less than n.

23. A correlator according to claim 22, and further comprising a counter operatively connected to the adder that is incremented by the counter whenever the addition of two m bit numbers results in an overflow.

24. A correlator according to claim 23, and further comprising a register operatively connected to said accumulator register and said counter that is latched by the output of said accumulator register and counter.

25. A correlator according to claim 20, and further comprising at least one serial-to-parallel conversion register positioned within each I and Q reference channel that serially receives the respective I and Q reference data and converts the reference data to respective n bit parallel I and n bit parallel Q reference data within respective I and Q reference channels.

26. A correlator according to claim 20, and further comprising at least one serial-to-parallel conversion register positioned within each I and Q signal channel that serially receives the respective I and Q signal data and converts the respective I and Q signal data to respective n bit parallel I and n bit parallel Q signal data within respective I and Q signal channels.

27. A method of correlating a signal having an in phase (I) and Quadrature (Q) signal components comprising the steps of:

receiving on a data bus blocks of n bit parallel I and n bit parallel Q signal data and n bit parallel I and n bit parallel Q reference data from respective I and Q signal channels and I and Q reference channels, wherein the data bus has n parallel paths extending therefrom;

multiplexing the I and Q reference data within each of the n parallel paths with a one bit shifted version of the respective n bit parallel I and n bit parallel Q signal data from an adjacent previous path to produce I and Q summed outputs based on the value of I and Q reference data on a bit by bit basis;

inputting the I and Q summed outputs into respective Wallace Tree Adders that are connected to each of the I and Q summed outputs within each of the n parallel paths and computing a count based on the number of bits that are set out of n bits;

adding partial correlation products into a single sum; and receiving pairs of I and Q component signal outputs from the parallel paths one at a time at one input bit time periods such that there is one correlation product output for every I and Q pair of input bits.

28. A method according to claim 27, and further comprising the step of incrementing a counter operatively connected to the adder whenever the addition of two numbers results in an overflow.

29. A method according to claim 27, and further comprising the step of receiving and storing within each I and Q signal channel a current block of n bit parallel I and n bit parallel Q signal data and an immediately previously received block of n bit parallel I and n bit parallel Q signal data.

30. A correlator according to claim 27, and further comprising the step of receiving and storing a current and previously received block of n bit parallel I and n bit parallel Q signal data within a circular buffer circuit.

31. A method according to claim 27, and further comprising the steps of storing I and Q reference data within a programmable read only memory (PROM);

reading the I and Q reference data upon power up of the correlator; and converting the I and Q reference data to n bit parallel I and n bit parallel Q reference data.

32. A method according to claim 31, and further comprising the step of serially receiving the respective I and Q reference data and converting the reference data to respective n bit parallel I and n bit parallel Q reference data within respective I and Q reference channels.

33. A method according to claim 31, and further comprising the step of receiving and storing sequences of n bit parallel I and n bit parallel Q reference data within at least one random access memory positioned within each of said I and Q signal channels based on predetermined clock cycles.

34. A method according to claim 31, and further comprising the step of correlating within a multiplexer having I and Q channel outputs and an n bit Wallace Tree Adder circuit connected within each of the I and Q channel outputs.

35. A method of correlating a signal having an in phase (I) and Quadrature (Q) signal components comprising the steps of:

serially receiving in phase (I) and quadrature (Q) signal data along parallel I and Q signal channels at one input bit time periods;

converting the data into blocks of n bit parallel I and n bit parallel Q signal data;

receiving on a data bus blocks of n bit parallel I and Q signal data and n bit parallel I and Q reference data from respective I and Q signal channels and I and Q reference channels, wherein the data bus has n parallel paths extending therefrom;

multiplexing the I and Q reference data within each of the n parallel paths with a one bit shifted version of the respective n bit parallel I and n bit parallel Q signal data from an adjacent previous path to produce I and Q summed outputs based on the value of I and Q reference data on a bit by bit basis;

inputting the I and Q summed outputs into respective Wallace Tree Adders that are connected to each I and Q summed outputs within each of the n parallel paths and computing a count based on the number of bits that are set out of n bits;

adding partial correlation products into a single sum; and receiving pairs of I and Q component signal outputs from the parallel paths one at a time at one input bit time periods such that there is one correlation product output for every I and Q pair of input bits.

36. A method according to claim 35, and further comprising the step of incrementing a counter operatively connected to the adder whenever the addition of two numbers results in an overflow.

37. A method according to claim 35, and further comprising the step of receiving and storing within each I and Q signal channel a current block of n bit parallel I and n bit parallel Q signal data and an immediately previously received block of n bit parallel I and n bit parallel Q signal data.

38. A method according to claim 35, and further comprising the step of receiving and storing a current and previously received block of n bit parallel I and Q signal data within a circular buffer circuit.

39. A method according to claim 38, and further comprising the steps of:

storing I and Q reference data within a programmable read only memory (PROM);

reading the I and Q reference data upon power up of the correlator; and converting the I and Q reference data to n bit parallel I and n bit parallel Q reference data.

40. A method according to claim 35, and further comprising the step of receiving and storing sequences of n bit parallel I and n bit parallel Q reference data within at least one random access memory positioned within each of said I and Q signal channels based on predetermined clock cycles.

41. A method according to claim 35, and further comprising the step of correlating within a multiplexer having I and Q channel outputs and an n bit Wallace Tree Adder circuit connected within each of the I and Q channel outputs.

* * * * *